United States Patent Office 3,426,132
Patented Feb. 4, 1969

3,426,132
FUNGICIDAL COMPOSITIONS CONTAINING COPPER BIS-DIMETHYL ACRYLATE
Heinz Frensch, Frankfurt am Main, Germany, assignor to Farbwerke Hoechst Aktiengesellschaft vormals Meister Lucius & Bruning, Frankfurt am Main, Germany, a corporation of Germany
No Drawing. Filed Oct. 14, 1963, Ser. No. 316,129
Claims priority, application Germany, Oct. 18, 1962,
F 38,076
U.S. Cl. 424—294    2 Claims
Int. Cl. A01n 9/24

ABSTRACT OF THE DISCLOSURE

Compositions containing copper bis-dimethyl acrylate as the active fungicidal ingredient of excellent plant tolerability.

The present invention relates to fungicides.

For controlling various kinds of fungi, particularly on plants, difficultly soluble copper salts have been used on a large scale in practice. In general, so-called Bordeaux mixtures and copper oxychloride have been used. Recently some other copper compounds, for example tetra-copper-calcium oxychloride and so-called activated copper hydroxides have also been used.

All these copper compounds are in some degree toxic to the plants treated. Moreover, in almost all cases a so-called "copper shock" is observed which becomes evident in a depression of growth. Attempts have therefore been made to replace the said copper compounds by other fungicides. Particularly organic fungicides, for example zinc- or manganese-ethylene-bis-dithiocarbamate or tri-chloromethyl-thio-tetra-hydrophthalimide (Captan), partially replace the copper compounds in some fields of application. It has been found, however, that the copper compounds cannot be dispensed with, particularly if there is a great danger of infestation.

Now I have found that the aforesaid disadvantages of copper-containing compounds can be avoided by using fungicides that contain, as active substance, copper-bis-dimethyl acrylate in usual preparations, for example as so-called "wettable powder", if desired in admixture with other known pesticides and/or fertilizers.

Copper-bis-dimethyl acrylate, a compound known per se, has an excellent plant tolerability and simultaneously a strong fungicidal action. It is surprising that the effectiveness of the compound is not directly proportional to its copper content but that the fungitoxicity of the compound is clearly higher than would correspond to the copper content. The compound, which may be used in the usual pesticidal formulations, may also be used in combination with other fungicides, insecticides, acaricides, nematicides or fertilizers. For preparing the fungicides of the invention, copper-bis-dimethyl acrylate is mixed with the inert substances, wetting agents, dispersing agents or adhesives commonly used for fungicidal formulations and/or other pesticides and fertilizers.

The following examples serve to illustrate the invention, but they are not intended to limit it thereto.

EXAMPLE 1

Vine plants which had been uniformly grown in a greenhouse were treated four times with a 0.1% suspension in water of a so-called "wettable powder" consisting of 25% of copper-bis-(dimethyl acrylate);
64% of precipitated silicic acid;
10% of cell pitch (dry cellulose waste liquor);
1% of oleyl methyl tauride.

Immediately after this treatment, the plants were contacted with a suspension of Peronospora spores and examined after an incubation period of 7 days for possible infestation with fungi. The examination showed that an infestation had been safely prevented.

EXAMPLE 2

Potato varieties susceptible to infestation with Phytophthora were treated three times during their growth in the fields with an aqueous suspension of a wettable powder consisting of 50% of copper-bis-(dimethyl acrylate);
38% of precipitated silicic acid;
10% of cell pitch (dry cellulose waste liquor);
2% of oleyl methyl tauride.

By spraying each time 900 to 1200 grams/hectare of active substance, an infestation with potato blight was safely prevented.

EXAMPLE 3

In a Peronospora year, hops growing in the fields were sprayed several times as a precaution with a 0.2% aqueous suspension of the composition described in Example 2. The plants remained free from infestation.

I claim:
1. A fungitoxic composition comprising an effective amount of copper bis-dimethyl acrylate, and precipitated silicic acid, cell pitch and oleyl methyl tauride.
2. A method of controlling fungi which comprises applying to said fungi an effective amount of copper bis-dimethyl acrylate.

References Cited

UNITED STATES PATENTS

| | | | |
|---|---|---|---|
| 2,423,611 | 7/1947 | Minich | 167—22 |
| 2,532,579 | 12/1950 | Thomas | 167—22 |
| 2,977,279 | 3/1961 | Kossmin | 167—22 |

FOREIGN PATENTS 104,177    6/1938    Australia.

ALBERT T. MEYERS, *Primary Examiner.*

J. GOLDBERG, *Assistant Examiner.*